Re. 16,646

May 31, 1927. F. A. MITCHELL

TOOL FOR REMOVING COLLARS AND THE LIKE

Original Filed Nov. 9, 1916 2 Sheets-Sheet 1

Inventor
Floyd Andrew Mitchell.
By Williams, Bradbury, Sea, & McCaleb Attys.

May 31, 1927. F. A. MITCHELL Re. 16,646

TOOL FOR REMOVING COLLARS AND THE LIKE

Original Filed Nov. 9, 1916 2 Sheets-Sheet 2

Inventor.
Floyd Andrew Mitchell.
By: William Bradbury
Sec, & McCaleb Attys.

Reissued May 31, 1927. Re. 16,646

UNITED STATES PATENT OFFICE.

FLOYD ANDREW MITCHELL, OF PORTLAND, OREGON.

TOOL FOR REMOVING COLLARS AND THE LIKE.

Original No. 1,259,036, dated March 12, 1918, Serial No. 130,434, filed November 9, 1916. Application for reissue filed August 10, 1921. Serial No. 491,276.

My invention relates to a collar removing tool and has as its principal object the provision of a continuous and effective device for quickly removing collars, gears and other wheels from shafts and axles and the like.

A further object of my invention resides in the particular arrangement and combination of parts hereinafter described.

In the accompanying drawing:—

Throughout the separate views the same part is designated by the same reference character.

Figure 1:
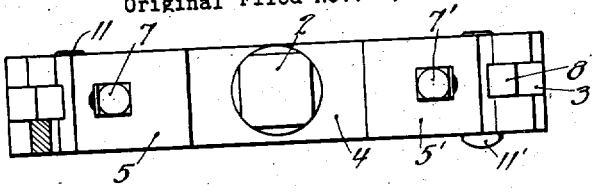
Figure 1 is a top plan view of a device embodying my invention, parts being broken away.
Figure 2:
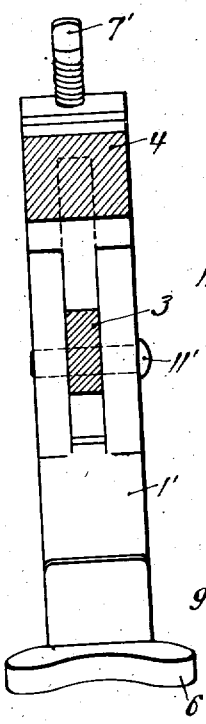
Fig. 2 is a vertical sectional view taken on the line A—A of Fig. 3.
Figure 3:
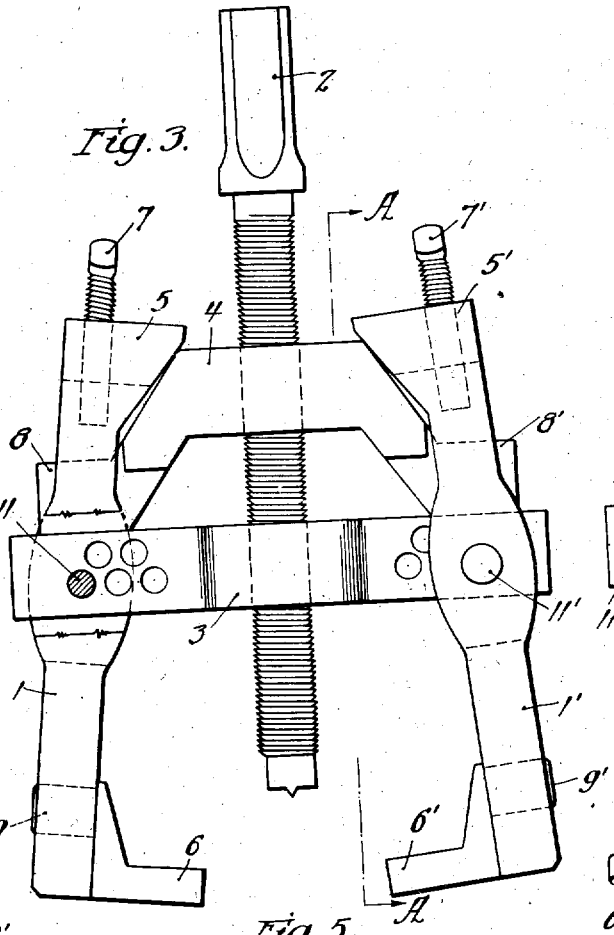
Fig. 3 is an elevational view of the device shown in Fig. 1, parts being broken away.

Referring more particularly to the drawings, 1 and 1′ are two longitudinal side pieces midway between which is a threaded rod 2, the pieces 1 and 1′ being held in proper relative position by being carried on the cross-piece 3 which is enlarged and provided with an opening at the center sufficient to permit the rod 2 to pass through without touching. Above the cross-piece 3, the rod 2 carries a second cross-piece 4 with which it has threaded engagement, the cross-piece 4 having outwardly and downwardly inclined shoulders adapted to engage with upwardly and inwardly inclined shoulders on the heads 5 and 5′ of the side pieces 1 and 1′, respectively. Consequently, it will be seen that if the member 2 is pulled upwardly, the side pieces 1 and 1′ will be thrown into vertical position by the engagement between the shoulders on the member 4 and those on the members 5 and 5′. The side pieces having been turned into the strictly vertical position or the position parallel to the rod 2, the set screws 7 and 7′ carried by the heads 5 and 5′ respectively, can be so set as to engage with the horizontal extensions 8 and 8′ at opposite ends of the cross-piece or yoke 4, so as to give a direct pull.

Figure 4:
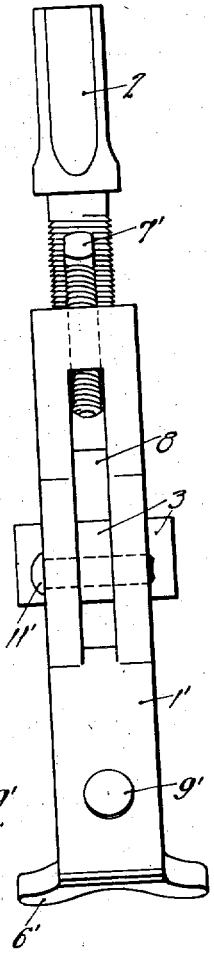
Fig. 4 is a side view of Fig. 3 looking from the right.
Figure 5:
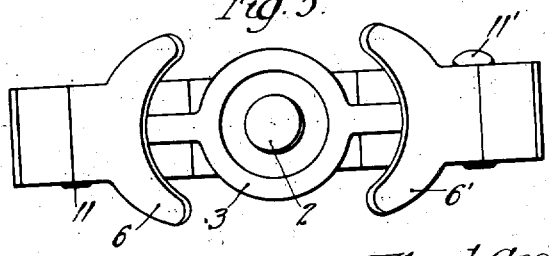
Fig. 5 is a bottom view of the device shown in Fig. 3.
Figure 6:
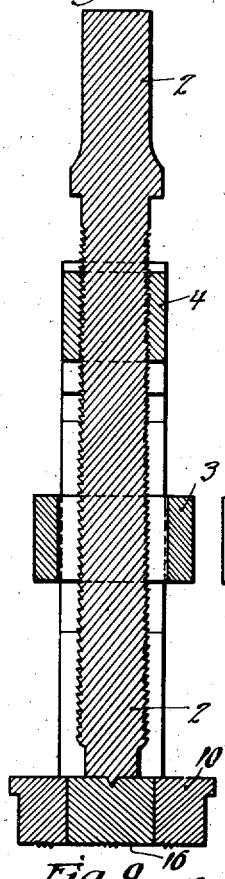
Fig. 6 is a vertical sectional view through the center of the device shown in Fig. 1 when the same has been set for removing a collar from a shaft.
Figure 7:
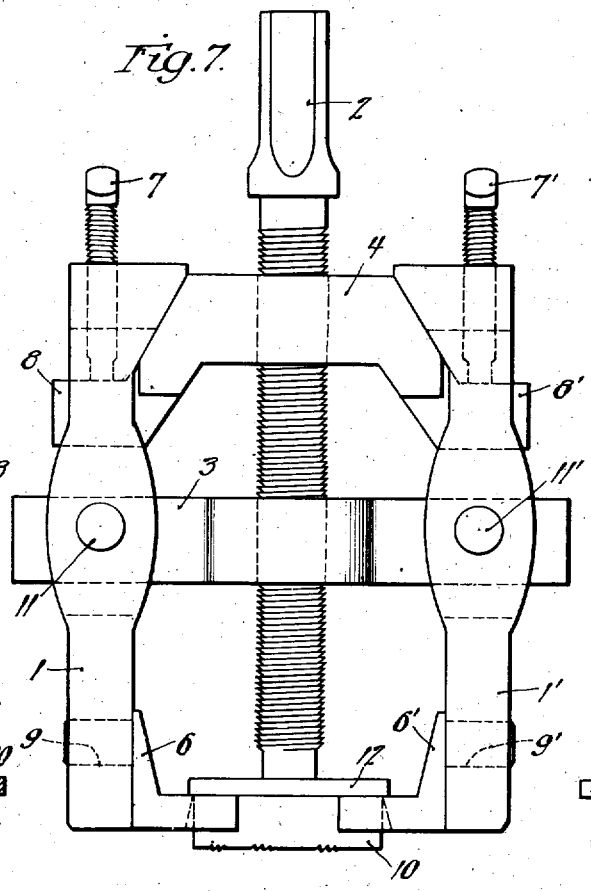
Fig. 7 is an elevational view of the same device in the position shown in Fig. 6.
Figure 8:
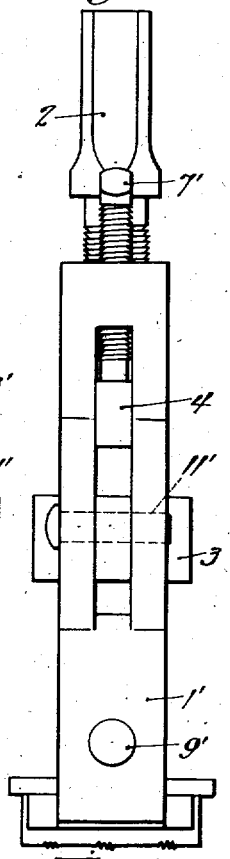
Fig. 8 is a side view of the device taken from the right of Fig. 7.
Figure 9:
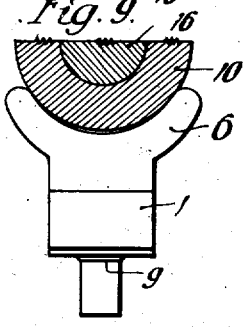
Fig. 9 is a detail view, partly in section, showing the engagement of one of the clamping jaws used with the collar to be removed.

At the lower ends of the members 1 and 1′ I provide engaging pieces such as 6 and 6′, those shown in Figs. 1, 2, 3 and 4 being in the form of jaws adapted to clamp a collar or the like beneath a flange such as 12 so that the pull may be transmitted from the side pieces 1, 1′ to the collar, the members 6 and 6′ having studs 9 and 9′ which project at right angles to the members 1 and 1′ and are seated in holes in the members 1 and 1′ as indicated in Fig. 4.

The side pieces 1 and 1′ are shown as being pivotally mounted on the cross-piece and are also capable of adjustment thereon by virtue of the fact that the cross-piece 3 is provided with a number of holes at each end in which the pivot pins 11 and 11′ for the members 1 and 1′, respectively, may be placed as desired, so as to vary the difference between the members 1 and 1′ and the central threaded rod 2.

Figure 10:
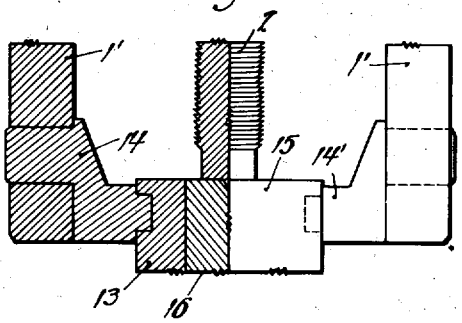
Fig. 10 is a detail view, partly in section, of a modified form of device.
Figure 11:
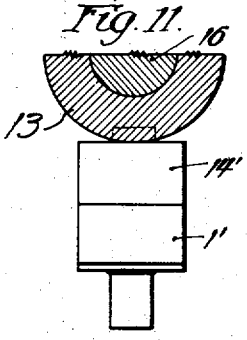
Fig. 11 is a detail view, partly in section, showing a modified engaging member such as is shown in Fig. 10, in engagement with the hub or collar to be removed.

In case the collar or wheel hub to be removed is not provided with a flange such as 12 under which the jaws 6 and 6′ may fit, the hub or collar is preferably drilled so as to provide small sockets or pockets to receive projections such as 13 on the engaging members 14 and 14′. Otherwise the arrangement shown in Figs. 10 and 11 is similar to that shown in the remaining figures.

In using my device, the side members 1 and 1′ may be thrown so that the parts 6 and 6′ or 14 and 14′, as the case may be, engage with the collar or hub such as 10 or 15 and the rod 2 is turned so as to bring the yoke 4 up into engagement with the shoulders 5 and 5′ so as to hold the jaw members against the collar or hub. The set screws 7 and 7′ are then adjusted so that the yoke 4 will take a direct pull and not wedge against shoulder 5, whereupon the rod 2 is turned so as to force against the shaft or axle 16 and draw the collar or hub therefrom.

Having thus described my invention, I claim:—

1. A tool for removing collars and the like from shafts and the like comprising in combination, a cross-piece, a pair of side pieces pivoted to said cross-piece, a yoke, a rod intermediate said side pieces having threaded engagement with said yoke, and means for transmitting stress from said yoke to said side-pieces for engaging them with a collar or the like.

2. A tool for removing collars and the like from axles and the like comprising in combination, a pair of side pieces, a cross-piece to which said side pieces are pivotally connected, a yoke, a threaded rod intermediate said side-pieces having threaded engagement with said yoke, one end of each of said side-pieces having a wedging engagement with said yoke whereby the said side pieces are spread at one end and brought together at the opposite end, means for transmitting stress from said yoke to said side pieces, and means for engaging said side pieces with a collar or the like.

3. A tool for removing collars and the like from axles and the like comprising in combination, a pair of side pieces, a cross-piece to which said side pieces are pivotally connected, a yoke, a threaded rod intermediate said side pieces having threaded engagement with said yoke, one end of each of said side pieces having a wedging engagement with said yoke whereby the said side pieces are spread at one end and brought together at said opposite ends, and means for transmitting stress from said yoke to said side pieces, means for engaging said side pieces with a collar or the like, said side pieces being adjustable on said cross-piece to vary the distance between them.

4. A tool for removing collars and the like from axles and the like comprising in combination, a pair of side pieces, a cross-piece to which said side pieces are pivotally connected, a yoke, a threaded rod intermediate said side pieces having threaded engagement with said yoke, one end of each of said side pieces having a wedging engagement with said yoke whereby said side pieces are spread at one end and brought together at the opposite end, means for transmitting stress from said yoke to said side pieces, and removable jaws on said side pieces for engaging them with the collar or the like.

5. In a tool for removig collars and the like in combination, a pair of pivotally mounted side pieces, means for applying a stress to said side pieces when in engagement with a member to be removed, and removable jaws on said side pieces for engaging the side pieces with the member to be removed, said jaws having a pin and socket connection with said side pieces, the pin and said side connection extending at right angles to the line of stress in said side pieces.

6. In a tool for removing collars and the like in combination, a pair of pivoted side pieces, means for placing stress on said side pieces, and engaging members on said side pieces for engaging the collar or the like member to be removed, said members having a pin and socket connection with said side pieces, said pin and said connection extending at right angles to the line of stress in said side pieces.

7. In a tool for removing collars and the like in combination, a cross-piece, side pieces adjustably pivoted to said cross-piece, a threaded rod intermediate said side pieces, a yoke having threaded engagement with said rod, said yoke having wedging engagement with said side pieces to spread the side pieces at their pivot points, and an adjustable stress contact member for transmitting the stress between said yoke and the side pieces.

In witness whereof, I hereunto subscribe my name this 3 day of August, 1921.

FLOYD ANDREW MITCHELL.